United States Patent [19]

Reves

[11] 3,768,510
[45] Oct. 30, 1973

[54] METHOD AND APPARATUS FOR FLOW RATE CALIBRATION
[75] Inventor: E. T. Reves, Odessa, Tex.
[73] Assignee: Dart Industries Inc., Los Angeles, Calif.
[22] Filed: June 23, 1971
[21] Appl. No.: 155,918

[52] U.S. Cl. .................. 137/551, 73/219, 73/239, 137/1, 137/552, 137/553, 137/554, 137/557, 222/30, 222/44, 222/70
[51] Int. Cl. ............................ G01f 3/14, G01f 3/16
[58] Field of Search .................... 73/219, 223, 239; 222/44, 70, 30; 137/1

[56] References Cited
UNITED STATES PATENTS
| 3,657,925 | 4/1972 | Gross | 73/239 |
| 2,957,484 | 10/1960 | Nordin | 137/1 |
| 2,772,664 | 12/1956 | Jones et al. | 73/239 |
| 3,148,591 | 9/1964 | Sheesley | 73/219 X |
| 2,733,606 | 2/1956 | Ifield | 73/239 |
| 799,531 | 9/1905 | Bryant | 92/5 R |

FOREIGN PATENTS OR APPLICATIONS
| 1,051,710 | 12/1966 | Great Britain | 73/239 |

Primary Examiner—Alan Cohan
Assistant Examiner—Gerald A. Michalsky
Attorney—Fred S. Valles et al.

[57] ABSTRACT

A flow rate calibration apparatus and method therefor is designed to accurately calibrate the flow rate of very small streams that are difficult and potentially dangerous to handle.

The apparatus comprises a hollow cylinder, a piston, valve means, conduit means interconnecting the foregoing elements, timing means for controlling the time interval the valve means remains in a calibrating position, alternating means for alternating between the calibrating position and a zeroing position of the valve means, and indicating means for indicating the relative position of the piston within the cylinder at a given instant of time. A transmitting means is preferably provided on the apparatus for translating the time interval and the reciprocal movement of the piston into units of volume displaced from the cylinder per time interval.

7 Claims, 7 Drawing Figures

INVENTOR.
E. T. REVES
BY Richard A. Donnell
ATTORNEY

METHOD AND APPARATUS FOR FLOW RATE CALIBRATION

BACKGROUND OF THE INVENTION

The present invention is directed to an apparatus and a method for calibrating the flow rate of a fluid and, more particularly, for accurately calibrating the flow rate of small streams of materials that are potentially dangerous to handle, such as catalysts.

The prior art method to calibrate the flow rate of such potentially dangerous streams was to periodically calculate the rate based on the variables of volume, pressure, temperature and time. This was very time consuming which resulted in detrimental delays before rate changes could be compensated for due to plant upsets. Developments in computer technology has led to the design of complex equipment which has been used in mass flow systems. However, where a number of small streams at various rates are being pumped into a number of different receiving vessels, there is a great need for a less complex and inexpensive answer to the calibration problem.

SUMMARY OF THE INVENTION

The present invention provides an answer to the problem of accurately calibrating small flow rates of fluids through a pump to a receiving vessel. The apparatus comprises:

A. a hollow cylinder having first and second openings in either end thereof;

B. a piston disposed in the cylinder in sliding engagement with its walls thereof and adapted for reciprocal movement between the first and second openings under the action of the fluid;

c. valve means for diverting the flow of the fluid from a pump to the first opening while simultaneously diverting the flow from the second opening to a receiving vessel for the fluid when the valve means is in a calibrating position and for diverting the flow of the fluid from the pump to the second opening while simultaneously diverting the flow from the first opening to the vessel when the valve is in a zeroing position;

D. conduit means interconnecting the pump, valve means, first and second openings, and the receiving vessel for flow of fluid from the pump through the valve means and the first opening to the cylinder and flow from the cylinder through the second opening and the valve means to the receiving vessel when the valve means is in a calibrating position and for flow from the pump through the valve means and the second opening to the cylinder and flow from the cylinder through the first opening and the valve means to the receiving vessel when the valve means is in a zeroing position;

E. timing means for controlling the time interval the valve means remains in the calibrating position;

F. alternating means operably connected to the timing means and to the valve means for alternating between the calibrating and zeroing positions on a signal from the timing means; and G. indicating means for indicating the relative position of the piston within the cylinder at a given instant of time.

The timing means comprises a timing circuit, switch means, relay means and a switch leg. The switch means is designed to convert a signal from the transmitting means into an electronic signal after a complete calibrating and zeroing cycle of the piston. The relay means activates the alternating means which places the valve means into its calibrating position in response to the signal from the switch means. In addition, the relay means resets the timing circuit to the proper time interval which is originally set by the plant operator. The timing circuit can be any commerically available timer. The switch leg of the timing means converts the electronic signal generated in the timing circuit after the fixed time interval has elapsed into an electronic signal to energize the relay means. The relay means then activates the alternating means to place the valve into its zeroing position. Each of the major elements making up the timing means is described in greater detail below the PREFERRED EMBODIMENT OF THE PRESENT INVENTION.

A second switch means can also be included in the timing means circuit to control the operation of the valve means in the event the switch leg or the timing circuit fails.

A transmitting means is connected to the indicating means for translating the reciprocal movement of the piston as indicated by the indicating means into a reading of the volume of fluid displaced from the cylinder during the calibrating portion of the cycle of the piston. A recording means is provided to continuously record this reading.

The method for calibrating the flow through a pump to a suitable receiving vessel such as a reactor when the fluid is a catalyst solution or slurry comprises the following steps:

A. setting the valve means into its calibrating position;

B. setting a timer for the interval of time the valve means is to remain in the calibrating position;

C. pumping for the fixed time interval the fluid through the valve means to the cylinder to urge the piston adapted for reciprocal movement within the cylinder from one opening to the other;

D. setting the valve means into a zeroing position;

E. pumping the fluid through the valve means until the piston returns to its original position which results in the fluid introduced in (C) to flow to the receiving vessel;

F. repeating steps (A), (B) and (C) which results in the fluid introduced in step (E) to flow to the receiving vessel; and G. translating the distance the piston moves during the calibrating portion of the cycle of the piston into flow rate of the fluid in units of volume of fluid displaced during the calibrating portion per the fixed time interval.

BRIEF DESCRIPTION OF THE DRAWINGS

The present invention will be more readily understood when read in conjunction with the accompanying drawings in which.

PREFERRED EMBODIMENT OF THE PRESENT INVENTION

Figure 1:
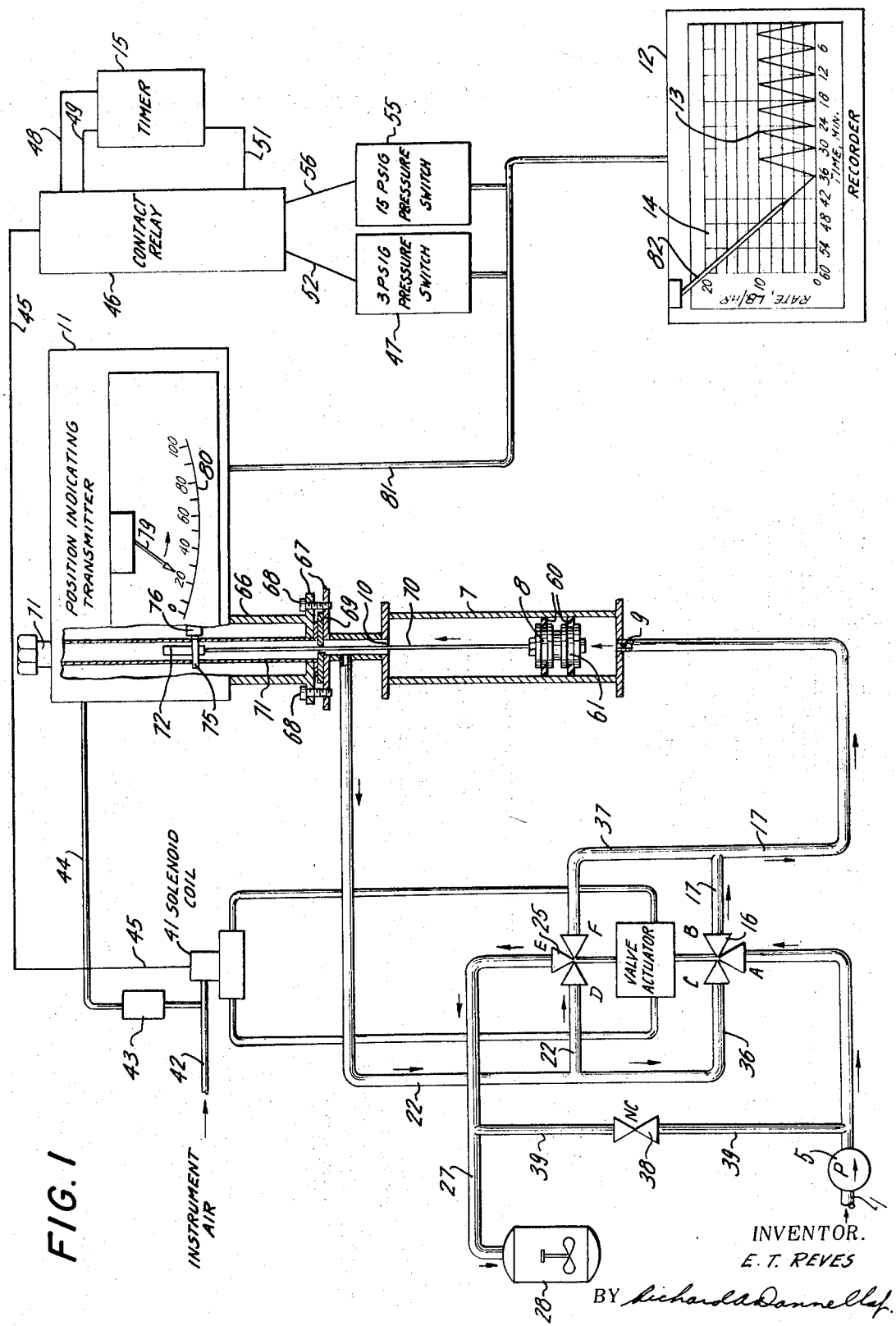
FIG. 1 is a schematic diagram of one embodiment of an apparatus of the present invention.

Referring now to the drawings in detail and, initially, FIG. 1, a catalyst slurry is pumped through supply conduit 1 from a feed source not shown via pump 5 into cylinder 7 to cause piston 8 to move from opening 9 toward opening 10. The movement of piston 8 is magnetically transmitted to position indicating transmitter 11 and is pneumatically transmitted to recorder 12. Recorder 12 continuously plots the rate, e.g., pounds per hour, of the fluid displaced from cylinder 7 per unit of time, e.g., minutes. Peak 13 on strip chart 14 of recorder 12 is an indication of the timed out position of piston 8. The length of time for piston 8 to reach this position is determined and initially set by the plant operator on timer 15. The exact setting depends on obtaining the optimum utilization of the stroke or volumetric displacement of piston 8 for a given size of cylinder and piston.

In one specific example a catalyst slurry having a density of about 8 pounds per gallon was to be maintained at a rate of 10 pounds per hour. The inside diameter of cylinder 7 was 3 inches and had a total volumetric displacement of about 36 cubic inches. The plant operator had previously selected strip chart 14 with graduations from 0 to 20 pounds per hour and set timer 15 at approximately 225-second intervals for the calibrating portion of the cycle of piston 8. Therefore, at the pump rate of 10 pounds per hour, piston 8 reciprocated between opening 9 and halfway to opening 10. By using only one-half the capacity of cylinder 7, the calibrator has sufficient flexibility for plant upsets and rate changes of up to 20 pounds per hour.

In the calibrating position, three-way valve 16 is held with ports A to B open so that the catalyst slurry passes through branch line 17 into cylinder 7. A second branch line 22 leads from opening 10 through the second valve 25 which is held with ports D to E open so that the slurry passes through discharge line 27 to stirred reactor 28 which is a conventional vessel for chemical reactions.

In its zeroing position, valve 16 is deactivated with ports A to C open. The catalyst slurry passes from line 1 through branch lines 36 and 22 and opening 10 into cylinder 7 to cause piston 8 to move toward opening 9. This, in turn, displaces the catalyst slurry in the lower chamber of cylinder 7 through branch lines 17 and 37 to valve 25 which has also been deactivated to hold ports F to E open so that the displaced slurry passes through discharge line 27 to provide reactor 28 with a continuous flow of catalyst slurry.

Bypass valve 38 which is normally closed is manually opened by the plant operator in the event of an upset in the operation of the flow rate calibration system of this invention and the catalyst slurry is then bypassed through line 39 to reactor 28. Valve 38 can be of any construction to suit this purpose.

Valves 16 and 25 are pneumatically actuated by means of valve actuator 40 which, in turn, is operated by means of solenoid coil 41. Instrument air for solenoid coil 41 is supplied at 60 to 100 psig. via line 42 from a source not shown. Instrument air is reduced to 20 psig. in pressure reducer 43 before being passed via line 44 to position indicating transmitter 11. Solenoid coil 41 is electrically deactivated and activated in response to signals through circuit 45 which are generated in contact relay 46. The signal to deactivate solenoid coil 41 is generated in timer 15 after the fixed time interval has elapsed at the end of the calibrating portion of the cycle. The signal to activate solenoid coil 41 is generated at the end of the zeroing portion of the cycle. Timer 15 is in electrical communication with relay 46 by means of leads 48, 49 and 51, and 3 psig. pressure switch 47 is electrically connected by relay 46 by means of lead 52.

15 psig. pressure switch 55 which is electrically connected to relay 46 by means of lead 56 is provided as a safety feature and comes into operation only when the pneumatic signal from position indicating transmitter 11 reaches 15 psig. The electronic circuit for the entire timing system is described in detail below in connection with a discussion of FIG. 3 and 5.

Resilient rings 60 are seated within grooves 61 on piston 8 to prevent fluid from passing between the upper and lower chanbers of cylinder 7. Preferably, resilient rings 60 are made of buna rubber and piston 8 is made of Teflon sold by E. I. duPont de Nemours and Company.

Cylinder 7 is attached to adapter 66 of position indicating transmitter 11 by means of flanges 67, bolts 68 and gasket 69. Adapter rod 70 is fastened to piston 8 and extends through opening 10 into casing 71. At the end of rod 70 that is opposite piston 8 is attached highly magnetized section 72. Metal follower 75 which is fastened to the end of follower arm 76 adjacent to casing 71 magnetically follows the movement of section 72 and directly transmits this movement to pointer 79. The relative movement of piston 8 is indicated by scale 80. This movement is pneumatically transmitted via line 81 to recorder 12 which continuously records the position indicated by pointer 79 by means of recording pen 82. The flow rate of the catalyst slurry corresponds to the peaks made by pen 82. The flow rate can be directly read from chart 14 because the operator coordinates the chart selection with the density of the particular material being pumped.

Figure 2:
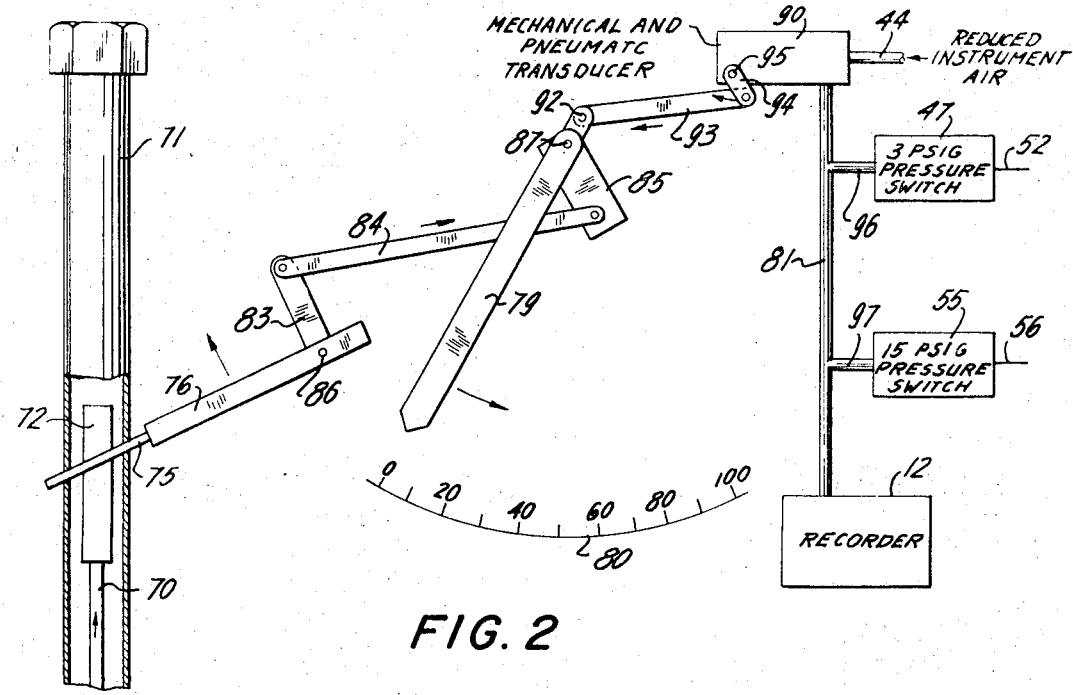
FIG. 2 is an internal detail of the position indicating transmitter at zero indication.

Referring now to FIG. 2, pointer 79 of position indicating transmitter 11 is at 0 on scale 80. Pointer 79 picks up the movement of follower 75 by means of linkages 83, 84 and 85 and pivots 86 and 87 which mechanically transmit this movement to mechanical and pneumatic transducer 90 by means of linkages 92, 93 and 94 and pivot 95. Transducer 90 pneumatically transmits the mechanical movement to recorder 12. Simultaneously, the pressure within the pneumatic system is sent to pressure switches 47 and 55 via lines 96 and 97, respectively.

Figure 3:
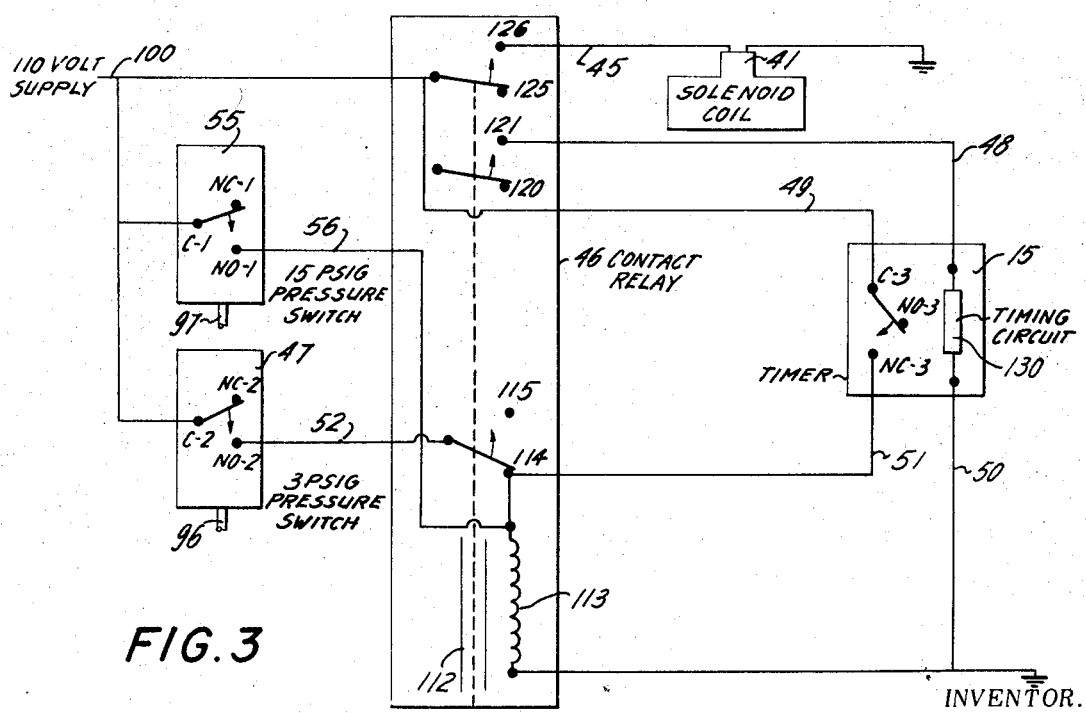
FIG. 3 is a diagram of the circuit employed by the calibration apparatus at the instant of zero indication.

Referring now to FIG. 3, a circuit diagram is depicted showing the position of pressure switch 47 and the three contact arms making up contact relay 46 at the exact instant pointer 79 reaches 0 at the end of the zeroing portion of the cycle. At this instant piston 8 is at the bottom of its stroke at opening 9. The pressure in the pneumatic system is at its lowest value, i.e., 3 psig, which causes a diaphragm (not shown) within pressure switch 47 to mechanically shift the switch to its NC-2 position. This breaks the circuit with the power supply through circuit 100. Pressure switch 47 immediately thereafter returns to its NO-2. This, in turn, causes mechanical contactor arm 112 in response to a signal from relay coil 113 to release its tension on the three contactors of relay 45 within contact relay 46 so that contract is shifted from terminal 114 to 115, terminal 120 to 121 and terminal 125 to 126. Shifting from terminal 114 to 115 prevents relay coil 113 from becoming energized when pressure switch 47 returns to its NO-2 position so that the terminals remain in their new position during the entire calibrating portion of the cycle. After contact is established at terminal 121, current passes through circuit branch 48 to timing circuit 130 of timer 15. Timing circuit 130, which is a capacitor charged solid state timer, operates in response to this signal to reset the time interval originally established by the plant operator for the calibrating portion of the cycle. Current passes through branch 45 to solenoid coil 41 when contact is established at terminal 126. This activates valve activator 40 which pneumatically adjusts valves 16 and 25 for the calibrating portion of the cycle as illustrated in FIG. 1.

Figure 4:
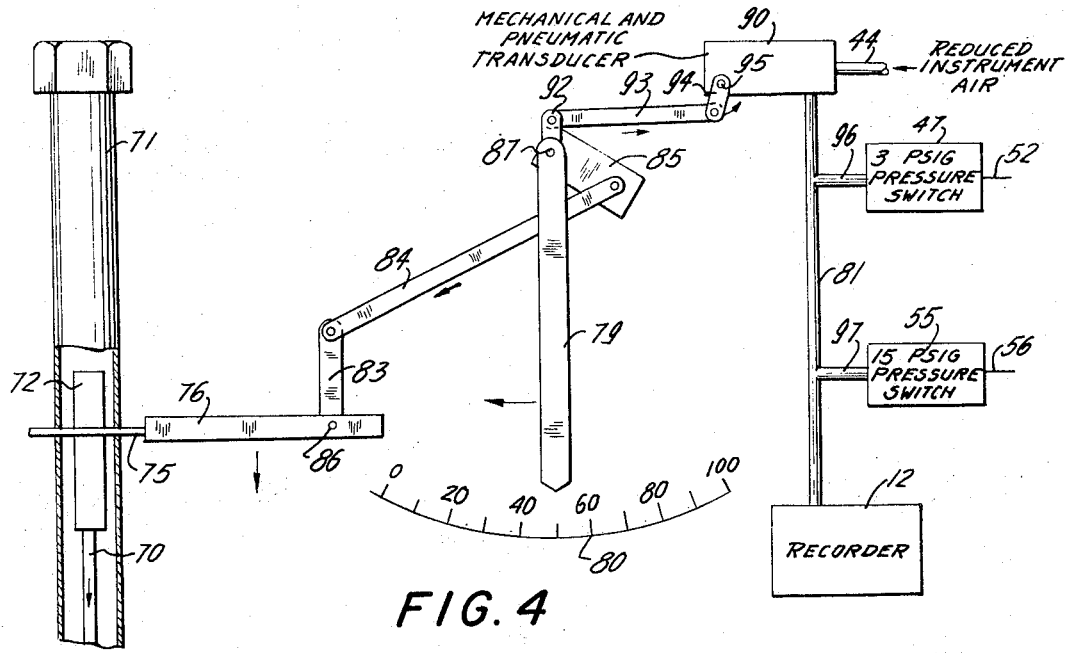
FIG. 4 is the internal detail of the position indicating transmitter at its timed out position.
Figure 5:
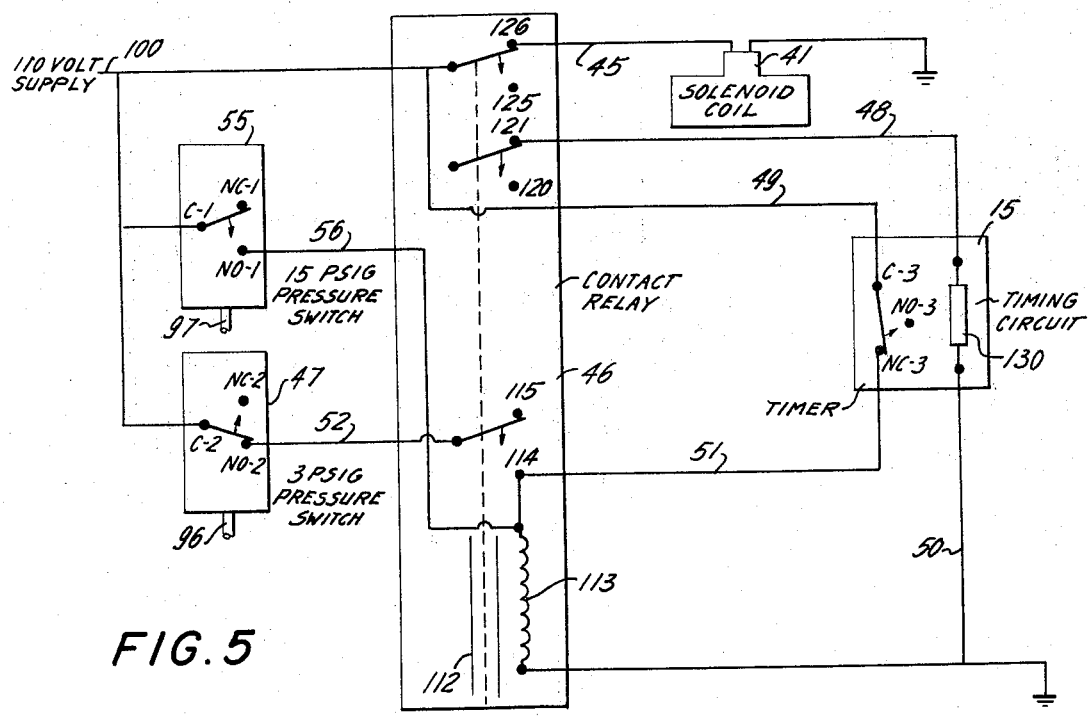
FIG. 5 is the diagram of the circuit employed by the calibration apparatus at the instant the transmitter is in its timed out position.

Referring now to FIGS. 4 and 5, pointer 79 is shown in its timed out position when the pressure in the pneumatic system is at 9 psig. At this instant, switch leg of timer 15 makes point contact with NC-3 in response to a signal from timing circuit 130 after the fixed time interval has elapsed. This, in turn, causes current to flow through circuit branches 49 and 51 to relay coil 113. Mechanical contactor arm 112 becomes activated causing the three contactors to reverse their positions, i.e., terminal 115 to 114, terminal 121 to 120 and terminal 126 to 125. Switch leg of timer 15 immediately thereafter shifts from NC-3 to NO-b 3 so that a circuit is established between pressure switch 47 and relay coil 113 at terminal 114 which holds the three contactors in their new positions during the entire zeroing portion of the cycle. The break in the circuit at terminal 121 deactivates timing circuit 130 during the zeroing portion of the cycle. Finally, breaking the circuit at terminal 126 causes solenoid coil 41 to deactivate valve activator 40 to reverse valves 16 and 25 for the zeroing portion of the cycle in the manner described above.

In the event the switch leg or timing circuit 130 fails and piston 8 continues to move past its timed out position and reaches opening 10, a pressure of 15 psig. is reached in the pneumatic system and pressure switch 55 is activated by the pneumatic signal through 97, causing the switch to shift from NC-1 to NO-1 completing the circuit through branch 56 with relay coil 113 which activates contact arm 112. This reverses the three contactors and deactivates solenoid coil 41 causing piston 8 to return to its zero position. Pressure switch 47 will then start the cycle again so that piston 8 operates between opening 9 and 10 of cylinder 7 until the flow rate calibration system can be pypassed through line 39 and the switch leg and/or timing circuit 130 failure corrected.

Pressure switch 55 will also be activated in the event the established rate, e.g., 20 pounds per hour in this example, is exceeded for any reason. This permits the plant operator to make temporary increases in the catalyst slurry flow rate beyond the fixed calibration limits of the apparatus without damage to the system.

Figure 6:
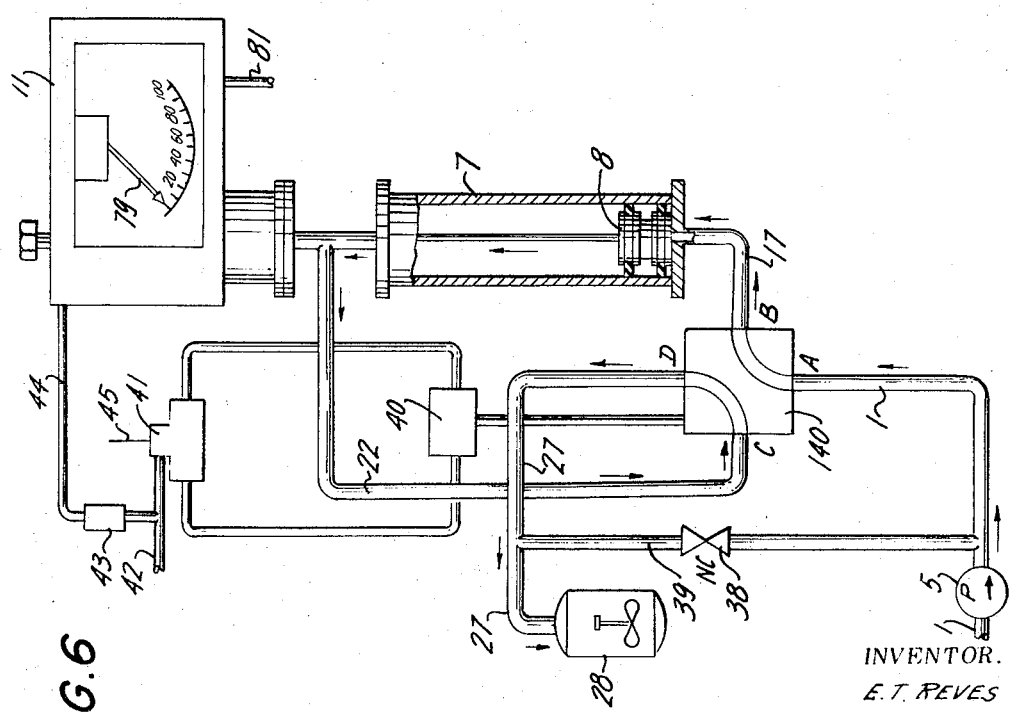
FIG. 6 is a schematic diagram of that portion of the apparatus of the present invention which shows that the two three-way valves of FIG. 1 are replaced by one four-way valve in its calibrating position.

In FIG. 6, four-way valve 140 is shown in its zero position with ports A to B and ports C to D open. This permits the fluid from the feed source to flow through supply conduit 1 via pump 5, branch line 17 into cylinder 7 and the fluid in the upper chamber of cylinder 7 to flow through branch line 22 and discharge line 27 into reactor 28.

Figure 7:
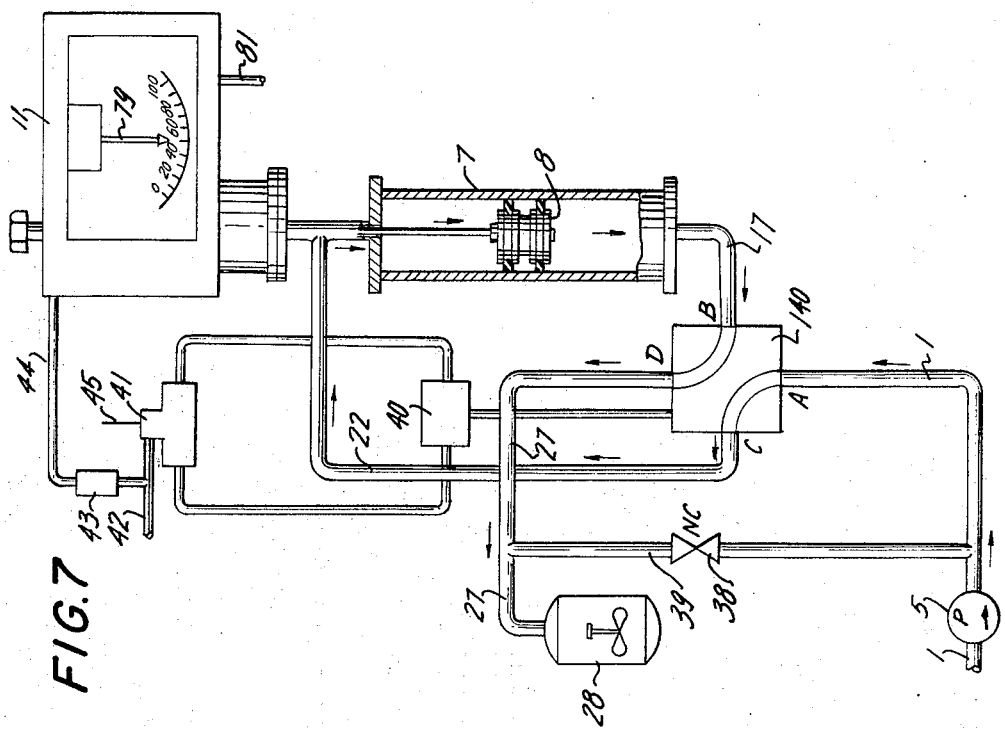
FIG. 7 is a schematic diagram of that portion of the apparatus of the present invention which shows the four-way valve in its zeroing position.

In FIG. 7, valve 140 is shown in its timed out position with ports A to C and ports B to D open. This permits the fluid to flow through supply conduit 1 via pump 5, branch line 22 into the upper chamber of cylinder 7 and the fluid in the lower chamber or cylinder 7 to flow through branch line 17 and discharge line 17 into reactor 28. The remaining elements shown in FIG. 6 and 7 are identical to those shown in FIG. 1 and are described above.

Although position indicating transmitter 11 is shown to operate pneumatically, electric or electronic transmitters can also be used. One suitable transmitter is the commerically available Magnabond Pneumatic Transmitter manufactured by Fischer & Porter Company. One suitable timing means for timer 15 that is commerically available is the Model IE-70 Eagle Signal Timer. Suitable commercially available pressure switches are the Model 12N-K-45 Static "O" Ring Switches.

The positive displacement calibration system of this invention has many advantages. The plant operator can immediately recognize any change in the flow rate and can compensate for them by varying the speed of the pump motor. Pulsations in the flow of fluid for any reason do not affect the accuracy of the system. By merely changing the sizes of the cylinder and/or the piston, one can calibrate a very wide range of flow rates. Less drastic changes in rate can easily be adjusted by a new setting on timer 15.

For example, one can calibrate flow rates of approximately 1 to 2 pounds per hour with exactly the same accuracy as 10 to 20 pounds per hour merely by replacing the three-inch diameter cylinder and piston disposed therein with a one-inch diameter cylinder and piston. The practical range of flow rates that can be accurately calibrated by the present apparatus is from practically zero flow up to rates of 40 to 80 pounds per hour which can be calibrated by conventional orifice-type meters. Such meters can not be used for viscous catalyst fluids and the like at such small rates because of the severe restrictions in flow through the small diameter orifices that would be required for calibrating these rates.

While only certain embodiments of this invention have been illustrated herein, it is understood that all variations and modifications falling within the scope of the appended claims are intended to be embraced thereby.

What is claimed is:

1. An apparatus for calibrating the flow rate of a fluid being pumped to a receiving vessel which comprises in combination:
   A. a hollow cylinder having a first and second opening in either end thereof;
   B. a piston disposed in said cylinder in sliding engagement with its walls thereof and reciprocative between the first and second openings under the action of the fluid;
   C. valve means for diverting the flow of the fluid from a pump to the first opening while simultaneously diverting the flow from the second opening to the receiving vessel when said valve means is in a calibrating position and for diverting the flow of the fluid from the pump to the second opening while simultaneously diverting the flow from the first opening to the receiving vessel when said valve means is in a zeroing position;

D. conduit means interconnecting the pump, valve means, first opening, second opening and receiving vessel for flow of the fluid from the pump through said valve means and the first opening to said cylinder and flow from said cylinder through the second opening and said valve means to the receiving vessel when said valve means is in the calibrating position and for flow from the pump through said valve means and the second opening to said cylinder and flow from said cylinder through the first opening and said valve means to the receiving vessel when said valve means is in a zeroing position;

E. timing means for controlling the time interval said valve means remains in the calibrating position;

F. alternating means operably connected to said timing means and said valve means for alternating between the calibrating and zeroing positions on a signal from said timing means; and G. indicating means for indicating the relative position of said piston within said cylinder at a given instant of time, and wherein transmitting means is provided for translating the reciprocal movement of said piston into a reading of the rate of fluid displaced from said cylinder, and wherein said timing means comprises a timing circuit, switch means for converting a signal from said transmitting means into an electronic signal after a complete calibrating and zeroing cycle of said piston, relay means for activating said alternating means to place said valve means into its calibrating position in response to the signal from said switch means, and for resetting said timing circuit for the given time interval and a switch leg for converting an electronic signal from said timing circuit after the time interval has elapsed into an electronic signal to energize relay means to activate said alternating means to place said valve means into its zeroing position.

2. The apparatus of claim 1 wherein a second switch means is provided for controlling the operation of said valve means in the event some element of said timing means fails.

3. An apparatus for calibrating the flow rate of a fluid being pumped to a receiving vessel which comprises in combination:

A. a hollow cylinder having a first and a second opening in either end thereof;

B. a piston disposed in said cylinder in sliding engagement with its walls thereof and reciprocative between the first and second openings under the action of the fluid;

C. valve means for diverting the flow of the fluid from a pump to the first opening while simultaneously diverting the flow from the second opening to the receiving vessel when said valve means is in a calibrating position and for diverting the flow of the fluid from the pump to the second opening while simultaneously diverting the flow from the first opening to the receiving vessel when said valve means is in a zeroing position;

D. conduit means interconnecting the pump, valve means, first opening, second opening and receiving vessel for flow of the fluid from the pump through said valve means and the first opening to said cylinder and flow from said cylinder through the second opening and said valve means to the receiving vessel when said valve means is in the calibrating position and for flow from the pump through said valve means and the second opening to said cylinder and flow from said cylinder through the first opening and said valve means to the receiving vessel when said valve means is in a zeroing position;

E. a timing circuit for controlling the time interval said valve means remains in the calibrating position;

F. indicating means for indicating the relative position of said piston within said cylinder at a given instant of time;

G. transmitting means for translating the reciprocal movement of said piston into a reading of the volume of fluid displaced from said cylinder;

H. switch means for converting a signal from said transmitting means into an electronic signal after a complete calibrating and zeroing cycle of said piston;

I. alternating means operably connected to said valve means for alternating between the calibrating and zeroing positions of said valve means;

J. relay means electrically connected to said alternating means and said timing circuit for activating said alternating means to place said valve means into its calibrating position in response to the signal from said switch means and for resetting said timing circuit for the given time interval; and K. a switch leg for converting an electronic signal from said timing circuit after the given time interval has elapsed into an electronic signal to energize relay means to activate said alternating means to place said valve means in its zeroing position.

4. The apparatus of claim 3 wherein recording means is provided to continuously record the reading from said transmitting means.

5. The apparatus of claim 3 wherein a second switch means is provided for controlling the operation of said valve means in the event some element of said timing means fails.

6. An apparatus for calibrating the flow rate of a fluid being pumped to a receiving vessel which comprises in combination:

A. a hollow cylinder having a first and a second opening in either end thereof;

B. a piston disposed in said cylinder in sliding engagement with its walls thereof and reciprocative between the first and second openings under the action of the fluid;

C. valve means for diverting the flow of the fluid from a pump to the first opening while simultaneously diverting the flow from the second opening to the receiving vessel when said valve means is in a calibrating position and for diverting the flow of the fluid from the pump to the second opening while simultaneously diverting the flow from the first opening to the receiving vessel when said valve means is in a zeroing position;

D. conduit means interconnecting the pump, valve means, first opening, second opening and receiving vessel for flow of the fluid from the pump through said valve means and the first opening to said cylinder and flow from said cylinder through the second opening and said valve means to the receiving vessel when said valve means is in the calibrating position and for flow from the pump through said valve means and the second opening to said cylinder and flow from said cylinder through the first opening and said valve means to the receiving vessel when said valve means is in a zeroing position;

E. a timing circuit for controlling the time interval said valve means remains in the calibrating position;

F. indicating means operably attached to said piston for indicating the relative position of said piston within said cylinder at a given instant of time;

G. transmitting means operably connected to said indicating means for translating the reciprocal movement of said piston into a reading of the volume of fluid displaced from said cylinder;

H. switch means pneumatically connected to said transmitting means for converting the lowest pneumatic signal from said transmitting means into an electronic signal after a complete calibrating and zeroing cycle of said piston;

I. alternating means operably connected to said valve means for alternating between the calibrating and zeroing positions of said valve means;

J. relay means electrically connected to said alternating means and said timing circuit for activating said alternating means to place said valve means into its calibrating position in response to the signal from said switch means and for resetting said timing circuit for the given time interval; and K. a switch leg electrically connected to said relay means and said timer for converting an electronic signal from said timing circuit after the given time interval has elapsed into an electronic signal to energize relay means to activate said alternating means to place said valve means in its zeroing position; and L. recording means operably connected to said transmitting means for recording the reading from said transmitting means as the rate of flow of the fluid.

7. The apparatus of claim 6 wherein a second switch means is pneumatically connected to said transmitting means and electrically connected to said relay means for energizing said relay means to activate said alternating means to place said valve means in its zeroing position in the event the pneumatic signal from said transmitting means reaches a predetermined maximum valve.

* * * * *